United States Patent [19]

Sakakibara et al.

[11] 4,408,462

[45] Oct. 11, 1983

[54] PRESSURE REGULATING DEVICE FOR USE IN AN AUTOMATIC TRANSMISSION

[75] Inventors: Shiro Sakakibara, Toyokawa; Shinobu Maseki, Anjo; Kazuaki Watanabe; Isamu Minemoto, both of Toyota, all of Japan

[73] Assignees: Aisin Warner Kabushiki Kaisha; Toyota Jidosha Kogyo Kabushiki Kaisha, both of Aichi, Japan

[21] Appl. No.: 184,833

[22] Filed: Sep. 8, 1980

[30] Foreign Application Priority Data

Sep. 13, 1979 [JP] Japan .................................. 54-118184

[51] Int. Cl.$^3$ ............................................. F16H 41/04
[52] U.S. Cl. ....................................... 60/330; 60/337; 60/339
[58] Field of Search .......................... 60/330, 337, 339; 74/731

[56] References Cited

U.S. PATENT DOCUMENTS 4,188,839 2/1980 Kubo et al. ...................... 137/625.3

Primary Examiner—Gerald A. Michalsky
Attorney, Agent, or Firm—Blum Kaplan

[57] ABSTRACT

A pressure regulating device for use in a hydraulic control system for an automatic transmission having a torque convertor, a gear transmission and an hydraulic control system provides a first pressure regulating valve for regulating the pressurized fluid output from a pump to a line pressure level, and applying the line pressure to the hydraulic control system. A second pressure regulating valve regulates the pressure of an excess portion of fluid supplied to the hydraulic control system from the first pressure regulating valve, and supplies the excess fluid to the torque convertor and regions requiring lubrication. Overheating of fluid in the torque convertor is prevented at low pressures by a bypass passage which assures at least a minimum fluid flow through the torque convertor at all times.

6 Claims, 5 Drawing Figures

PRESSURE REGULATING DEVICE FOR USE IN AN AUTOMATIC TRANSMISSION

BACKGROUND OF THE INVENTION

The present invention relates generally to a pressure regulating device for use in an automatic transmission and more particularly to a fluid pressure regulating device which is adapted to feed fluid discharged from a hydraulic pump into a torque convertor and particular portions of the transmission for lubrication.

The pressure of fluid discharged from the pump is regulated to a line pressure commensurate with vehicle speed and engine output through a first pressure regulating valve. The pressurized fluid is supplied to each of a plurality of hydraulic power cylinders. Pressure of excess fluid supplied to the hydraulic control system from the first pressure regulating valve is regulated commensurate with the vehicle speed and engine output through a second pressure regulating valve. The pressurized fluid from the second pressure regulating valve is applied to the torque convertor and selected portions of the transmission for lubrication. The pressurized fluid supplied to the torque convertor circulates in the torque convertor and is discharged from the torque convertor through a return passage, an intermediate passage of the second pressure regulating valve and optionally through a cooler to return to a fluid reservoir.

In the prior art, this second pressure regulating valve is adapted to close the return passage from the torque convertor to the reservoir so that when the engine is stopped, the oil pressure in the torque convertor is not discharged from the torque convertor to the cooler and the oil reservoir.

When an automatic transmission having such a pressure regulating device is installed on an automotive vehicle having an engine of increased capacity, because line pressure is set higher in accordance with the increased capacity, the second pressure regulating valve receives a diminished quantity of excess fluid from the first pressure regulating valve which causes diminished functional performance by the second pressure regulating valve. Particularly, upon running of the automotive vehicle at low speed, the second pressure regulating valve does not perform its pressure regulating function and excess fluid is introduced directly into the torque convertor and the respective portions of the transmission requiring lubrication. As a result, the return passage from the torque convertor by way of the second pressure regulating valve is closed. By closing of this return passage, no circulation of fluid is caused in the torque convertor, thereby overheating the fluid within the torque convertor, increasing leakage and decreasing the quantity of fluid discharged from the pump.

In order to prevent such overheating of fluid or oil in larger capacity engines, a pump having an increased pumping capacity is required. Use of a larger pump uses more engine power and engine output, thereby raising operational costs and requiring modification of engine parts. Accordingly, such a solution, that is, installing such an enlarged capacity pump is not preferable on the automatic transmission.

What is needed is a pressure regulating device for use in an automatic transmission on larger capacity engines which is of normal capacity and does not allow overheating of the fluid in the torque convertor.

SUMMARY OF THE INVENTION

Generally speaking, in accordance with the invention, a pressure regulating device for use in an automatic transmission especially suited to prevent overheating of the fluid in a torque convertor at low operational speeds is provided. The pressure regulating device provides a first pressure regulating valve for regulating the pressurized fluid output from a pump to a line pressure level and for applying the line pressure to a hydraulic control system. A second pressure regulating valve regulates the pressure of an excess portion of fluid supplied in the hydraulic control system from a first pressure regulating valve, and supplies the excess fluid to the torque convertor and regions of the transmission requiring lubrication.

The first pressure regulating valve decreases the quantity of fluid supplied to the second pressure regulating valve when the quantity of fluid supplied to the hydraulic control system is substantial. This reduction in fluid quantity causes a reduction in the pressure of fluid. A spool valve of the second pressure regulating valve moves in response to the reduction of fluide pressure and closes a fluid passage providing a return from the torque convertor to a reservoir. By this spool movement, the fluid pressure generated in the second pressure regulating valve is increased.

A bore hole connects a passage, which introduces the fluid from the torque convertor to the second pressure regulating valve, with a passage which returns the fluid from the second pressure regulating valve to the reservoir. Under the condition where the spool valve of the second pressure regulating valve cuts off flow from the torque convertor to the second pressure regulating valve, a minimum necessary circulation of oil is maintained in the torque convertor by means of the bore hole which acts as a bypass flow circuit.

In summary, a pressure regulating device according to the present invention includes an orifice or bore means for bypassing a portion of fluid flow from the torque convertor to the reservoir under low pressure or low engine speed conditions where the flow would otherwise cut off and the danger of overheating the fluid in the torque convertor exists.

Accordingly, it is an object of this invention to provide an improved pressure regulating device for use in an automatic transmission which prevents overheating of the fluid in the engine torque convertor.

Another object of this invention is to provide an improved pressure reulating device for use in an automatic transmission which eliminates the need for an enlarged fluid pump when the engine capacity is increased.

A still further object of this invention is to provide an improved pressure regulating device for use in an automatic transmission whereby a continuous flow of fluid to the torque convertor is provided at all levels of engine speed and output.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
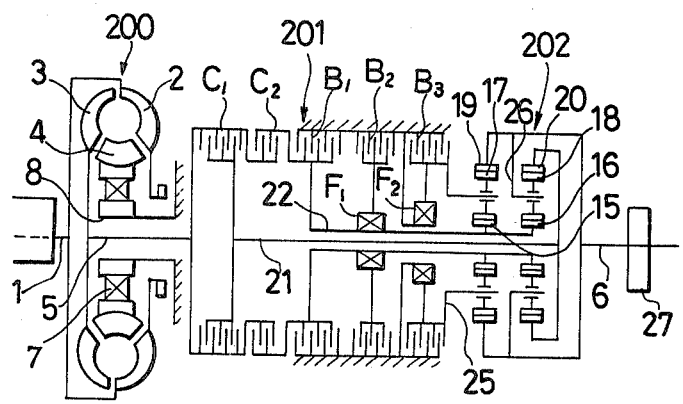
FIG. 1 is a schematic drawing of one embodiment of an automatic transmission suitable for the application thereto of a pressure regulating device in accordance with this invention.
Figure 2:
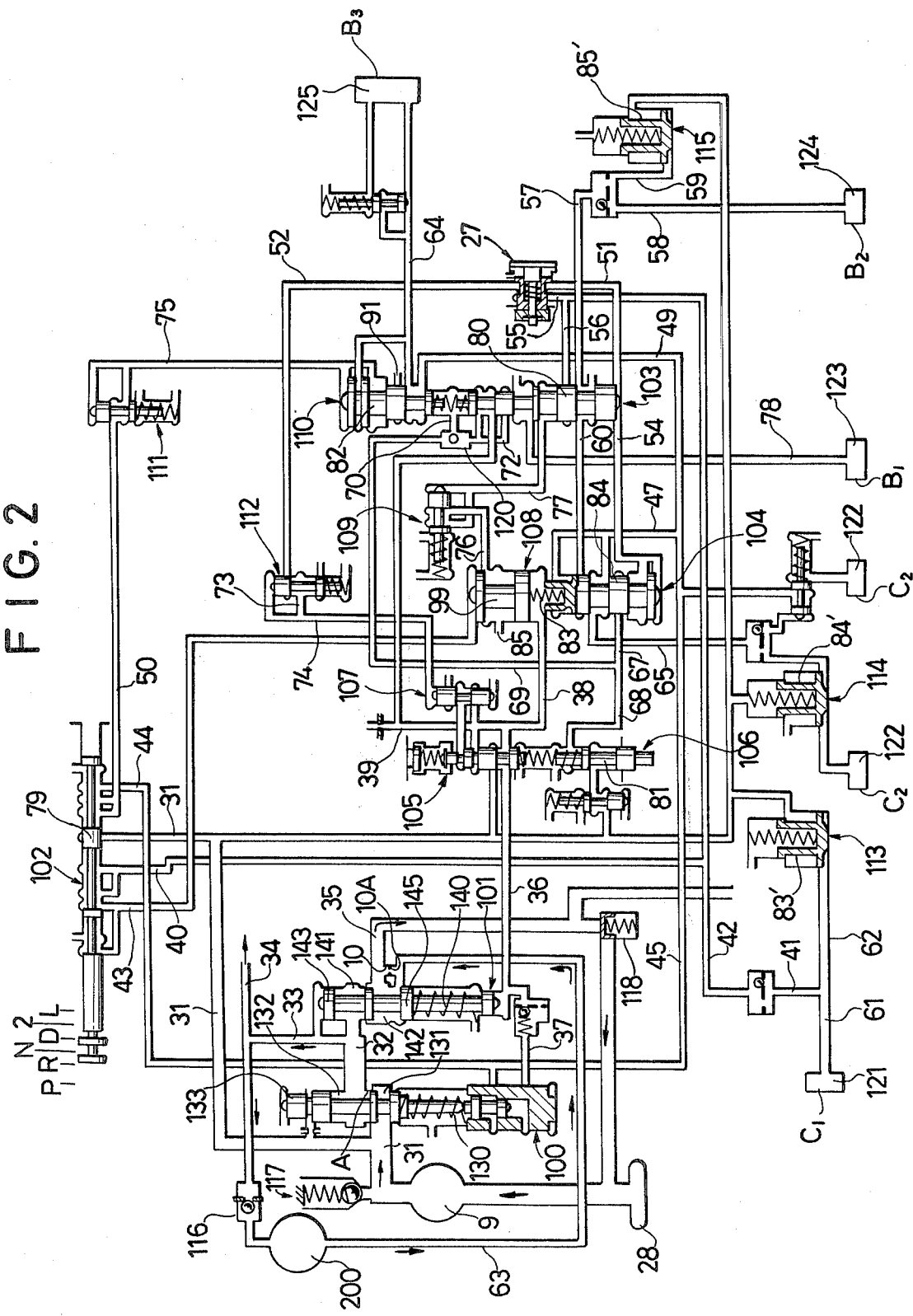
FIG. 2 is a flow circuit diagram of an embodiment of a hydraulic control system including the pressure regulating device in accordance with this invention.

With reference to the figures and initially to FIG. 1, there is shown an automatic transmission having three forward speed gears and one reverse speed gear. This transmission is suited for application of a pressure regulating valve in accordance with this invention. FIG. 2 shows a pressure regulating device in accordance with this invention incorporated in an hydraulic control system for the automatic transmission shown in FIG. 1.

The automatic transmission (FIG. 1) comprises a torque convertor 200, and a three-forward speed, one-reverse speed gear transmission 201. The torque convertor 200 is provided with a pump impeller 2, a turbine runner 3 and a stator 4. Power is transmitted from an engine output shaft 1 of an engine to an intermediate shaft 5 through the intermediary of the torque convertor 200 and is transmitted to an output shaft 6 by way of a gear transmission 201. The stator 4 is mounted on a fixed axle through the intermediary or a one-way clutch 8. Also included are an oil pump 9 and a governor valve 27 fixed on the output shaft 6.

The gear transmission 201 is comprised of clutches $C_1$, $C_2$, brakes $B_1$, $B_2$ and $B_3$, one-way clutches $F_1$, $F_2$, and planetary gear train 202 including sun gears 15, 16, pinions 17, 18, and ring gears 19, 20. The gear shift positions of the automatic transmission and the operational conditions of clutches and brakes are shown in Table 1.

TABLE 1

| Gear shift position | | Clutches and brakes | | | | | |
|---|---|---|---|---|---|---|---|
| | | $C_1$ | $C_2$ | $B_1$ | $B_2$ | $B_3$ | $F_1$ | $F_2$ |
| Reverse | R range | — | o | — | — | o | — | — |
| Forward First speed | D.2 range | o | — | — | — | — | — | o |
| First speed | L range | o | — | — | — | Δ | — | o |
| Second speed | D range | o | — | — | o | — | o | — |
| Second speed | 2 range | o | — | Δ | o | — | o | — |
| Third speed | D range | o | o | — | o | — | — | — |

In the Table, the circle symbol (o) represents an engaged or lock condition of an one-way clutch. The triangular symbol (Δ) represents an engagement of brakes upon engine braking. The dash symbol (-) represents a released condition of a clutch or brake or a non-locked condition of a one-way clutch.

The hydraulic control system (FIG. 2) for the automatic transmission comprises an oil reservoir 28, an oil pump 9, a first pressure regulating valve 100, and a second pressure regulating valve 101 for providing a pressure regulating device. Also included are a manual speed selecting valve 102, a 1-2 shift valve 103, a 2-3 shift valve 104, a throttle valve 105, a kick down valve 106, a cutback valve 107, a governor valve 27, an intermediate shift valve 108, an intermediate modulator valve 109, a low coast shift valve 110, a low modulator valve 111, and a governor modulator valve 112.

Further, the system includes an accumulator 113 for the clutch $C_1$, an accumulator 114 for the clutch $C_2$, an accumulator valve for the brake $B_2$, a check valve 116, a pressure relief valve 117, a cooler by-pass valve 118, a change-over valve 120, a hydraulic servo 121 for the clutch $C_1$, a hydraulic servo 122 for the clutch $C_2$, a hydraulic servo 123 for the brake $B_1$, a hydraulic servo 124 for the brake $B_2$, a hydraulic servo 125 for the brake $B_3$, and oil passages connecting the above valves and hydraulic servos.

Line pressure in an oil passage 31 from the pump 9 discharge is supplied to the first pressure regulating valve 100 and from there to the manual speed selecting valve 102, the kick down valve 106, the throttle valve 105, and the accumulators 113-115. Oil or throttle pressure regulated at the throttle valve 105 is introduced to the second pressure regulating valve 101 by way of an oil passage 36 and further to the first pressure regulating valve 100 by way of an oil passage 37. Also, the oil pressure is introduced to the 2-3 shift valve 104 by way of an oil passage 38 and to the 1-2 shift valve 103 via an oil passage 39.

Line pressure introduced to the kick down valve 106 through the oil passage 31 is applied to the 2-3 shift valve 104 via oil passages 67, 68 and is applied via an oil passage 69 to the change-over valve 120 which communicates with the 1-2 shift valve 103 through oil passages 70, 72.

The manual speed selecting valve 102 is used to select respective gear shift positions. By this manual speed selecting valve 102, oil pressure, that is, line pressure, regulated at the first pressure regulating valve 100, is supplied to the hydraulic servo 121 for friction clutch $C_1$ by way of the oil passages 40,41,42,61 and to the accumulator 113 by way of the oil passages 40, 41, 42, 62. The pressure from the speed selecting valve 102 is also applied to the governor valve 27 by way of the oil passages 40, 55, to the 1-2 shift valve 103 by way of the oil passages 40, 56, to the 2-3 shift valve 104 by way of an oil passage 43, to the first pressure regulating valve 100 by way of oil passages 44, 45, to the 2-3 shift valve 104 by way of the oil passages 44, 45, 47, to the 1-2 shift valve 103 via the oil passages 44, 45, 49, and further to the low modulator valve 111 by way of an oil passage 50.

Further, the pressure relief valve 117 provided in the oil passage 31 controls the maximum oil pressure generated at the output of the oil pump 9. The cooler by-pass valve 118, provided in the oil passage 35, controls the oil pressure supplied to a cooler (not shown) at a lower pressure.

Further, oil regulated to a pressure commensurate with rotational speed by the governor valve 27, that is, oil at governor pressure, is supplied to the governor modulator valve 112 through an oil passage 52, to the 1-2 shift valve 103 by way of an oil passage 51 and to the 2-3 shift valve 104 by way of the oil passages 51, 54.

Line pressure supplied to the 1-2 shift valve 103 through the oil passage 56 is supplied to the hydraulic servo 124 for friction brake $B_2$ through oil passages 57, 58 to the accumulator 15 through the oil passages 57, 59 and also to the 2-3 shift valve 104 through an oil passage 60.

Line pressure fed from the oil passage 45 to the 1-2 shift valve 103 is supplied to the hydraulic servo 125 for the friction brake $B_3$ by way of an oil passage 64.

Line pressure supplied to the 2-3 shift valve 104 through the oil passage 47 is introduced to the accumulator 114 and to the hydraulic servo 122 of friction clutch $C_2$ by way of an oil passage 65.

The governor pressure supplied to the governor modulator valve 112 through the oil passage 52 is pressure-regulated and is introduced to the cut-back valve 107 through oil passages 73, 74.

Line pressure supplied to the low modulator valve 111 through the oil passage 50 is introduced to the low coast shift valve 110 through an oil passage 75 after pressure regulation by the low modulator valve 111.

Line pressure supplied to the intermediate shift valve 108 through the oil passage 43 is further supplied to the intermediate modulator valve 109 by way of an oil passage 76 and is introduced into the 1-2 shift valve 103 via an oil passage 77 after pressure regulation by the modulator valve 109. Thereafter, the line pressure is supplied to the hydraulic servo 123 of friction brake B through an oil passage 78.

The manual speed selecting valve 102 causes a valve body 79 to slide with the shift operation of an external lever, or the like, at the driver's seat and distributes the line pressure within the oil passage 31 to each oil passage in accordance with the gear shift position of the lever, as shown in Table 2.

TABLE 2

| Gear shift | P | R | N | D | 2 | L |
|---|---|---|---|---|---|---|
| Oil Passage 40 | — | — | — | o | o | o |
| Oil Passage 43 | — | — | — | — | o | o |
| Oil Passage 44 | — | o | — | — | — | — |
| Oil Passage 50 | o | o | — | — | — | o |

In Table 2, the circular symbol (o) represents existence of the line pressure introduced in the oil passage at each of gear shift positions, and the dash symbol (-) represents non-existence of the line pressure in the oil passage.

Symbols P, R, N, D, 2 and L represent gear shift positions as follows:

P: Park. When parking, a parking lock pawl (not shown) meshes with the outer periphery of the front ring gear 19 whereby the output shaft 6 is locked in position.

R: Reverse drive from the output shaft 6.

N: Neutral. Oil pressure is not supplied anywhere from the manual speed selecting valve and engine power is not transmitted to the output shaft 6.

D: Forward. In this embodiment, an automatic three-forward speed transmission is shown wherein shifting up to a higher speed gear or shifting down to a lower speed gear is automatically accomplished.

2: Shifting up to second speed or shifting down to first speed is automatically accomplished.

L: Low. A fixed position at the first speed is maintained. Each valve is constructed as described below in order to smoothly perform engagement of frictional elements, shown in Table 1, by each of the shift positions described above of the manual speed selecting valve.

The first pressure regulating valve 100 automatically regulates the oil pressure fed to each element to a pressure level commensurate with the vehicle speed and the engine output. Opening of the carburetor throttle controls vehicle speed in an automobile.

The second pressure regulating valve 101 regulates the oil pressure of the torque convertor 200, the lubricant oil pressure and cooler pressure to a pressure level commensurate with the vehicle speed and the opening of the carburetor throttle.

The governor valve 27 generates an oil pressure commensurate with the rotational speed of the output shaft 6.

The throttle valve 105 is adapted to generate a throttle pressure commensurate with the opening of the carburetor throttle, that is commensurate with the output of the engine.

Oil pressure commensurate with the throttle opening is fed to the first pressure regulating valve 100 and the second pressure regulating valve 101 so as to regulate the line pressure and this pressure is also fed to the 1-2 shift valve 103 and the 2-3 shift valve 104 for acting against the governor pressure.

The 1-2 shift valve 103 automatically controls changeover between the first and second speeds depending on a balancing of the relationship between the governor pressure and throttle pressure. Under the condition where the governor pressure supplied from the oil passage 51 is high, and the throttle pressure supplied from the oil passage 39 is low, a valve body 80 of the 1-2 shift valve 103 moves to an upper position urged by the higher level of governor pressure. In this condition the oil passages 56, 57 communicate with each other whereby the line pressure is supplied to the hydraulic servo 124 associated with the friction brake $B_2$ by way of the oil passages 57, 58. The brake $B_2$ engages to establish the second speed.

When the governor pressure is low and the throttle pressure is high, the valve body 80 in the 1-2 shift valve 103 moves to a lower position as a result of the throttle pressure and blocks the connection between oil passages 56, 57 to achieve the first speed.

The kickdown valve 106 has its valve body 81 move upwardly rapidly when the carburetor throttle valve is opened almost to the maximum. Then the oil passages 31 and 68 connect with each other permitting the oil pressure to act on the 2-3 shift valve 104 through the oil passage 67. This position of the valve body 81 also permits the oil pressure to act on the 1-2 shift valve 103 by way of the changeover valve 120 and the oil passage 70.

When in the Low (L) range, the low modulator valve 111 regulates the line pressure to a low oil pressure level. This occurs when the line pressure acts on the low modulator valve 111 through the oil passage 50 and the regulated oil pressure acts on the low coast shift valve 110 through the oil passage 75. Thereby, the low coast shift valve 110 moves downwardly to connect oil passages 75, 64 with each other. The low oil pressure acts on the hydraulic servo 125 of brake $B_3$ to maintain the first speed.

When in the reverse (R) range, the low coast shift valve 110 causes a valve body 82 within the valve to move upwardly against the lower oil pressure from the low modulator valve 111 when the line pressure acts on the low coast shift valve 110 through the oil passage 49.

Thereby, the oil passages 49 and 64 connect with each other and line pressure is introduced into the hydraulic servo 125 associated with the brake B3 to fix the gear transmission at the reverse gear condition.

The governor modulator valve 112 regulates the governor pressure from the oil passage 52 to a predetermined value to thereby permit the oil to act on the cut-back valve 107 through the oil passages 73,74. The cut-back valve 107 actuates in response to the oil pressure from the oil passage 74 and the throttle pressure, thereby regulating the cut-back oil pressure acting on the throttle valve 105. By this reduced oil pressure acting on the throttle valve 105, the throttle pressure is lowered whereby an unecessary loss of power at the oil pump 9 is prevented.

The accumulators 113,114,115 are interposed in the oil passages 62,65,59 respectively and relieve the shock when the friction clutches $C_1$, $C_1$ and the friction brake $B_2$ are engaged. The oil passage 59 connects to an oil passage 58.

An area difference exists between the acting side and back pressure side of the accumulator pistons 83′, 84′, 85′, the area of the acting sides being larger. The line pressure always acts on the back pressure side through the oil passage 31 and the pistons 83′, 84′, 85′ are pushed downwardly. When the line pressure acts on the acting side of the accumulator pistons through the oil passages 62,65 or through the oil passage 59, the piston 83′, 84′, 85′, respectively, is slowly pushed upwardly so as to relieve the shock which occurs upon an engagement of clutches and brakes.

The 2-3 shift valve 104 performs the change-over between second speed and third speed. A valve 84 is controlled in position by the governor pressure supplied through the oil passage 54, by the throttle pressure supplied through the oil passage 38 and which opposes the governor pressure, and by a spring 83. When the governor pressure is high, the valve 84 assumes an upper position operating against the throttle pressure and the force of the spring 83. Thereby, the oil passages 60, 65 communicate with each other, supplying the line pressure to the hydraulic servo 122 associated with the friction clutch $C_2$ through the oil passage 65. Thereby a third speed is established.

During this time, the connection between the oil passage 76 and the oil passage 43 is cut off in the intermediate shift valve 108 and the oil passage 76 exhausts through an exhaust oil port 85. Thereby, the line pressure which had been fed to the hydraulic servo 123 of the friction brake $B_1$ is relieved.

When the governor pressure is low, the valve 84 is pushed back, that is, downwardly by the throttle pressure and the force of the spring 83. The oil hydraulic circuit to the hydraulic circuit 123 of the friction brake $B_1$ is cutoff to thereby establish a second speed.

However, for kick-down, because the oil pressure through the oil passage 67 acts on the valve 84 to push the valve 84 downwardly, down shift to the second speed is performed at a higher vehicle speed than the case described above.

Figure 3:
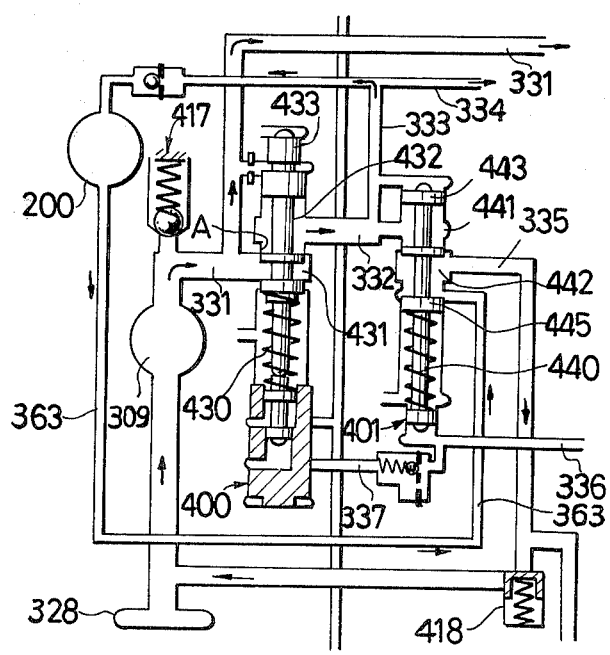
FIG. 3 is a flow circuit diagram of a conventional oil pressure regulating device of the prior art.

In a conventional pressure regulation device of the prior art for supplying an oil pressure commensurate with the vehicle speed to a hydraulic control system and torque convertor of an automatic transmission, the pressure regulating device comprises, as shown in FIG. 3, an oil pump 309, a first pressure regulating valve 400 and a second pressure regulating valve 401. In this oil pressure regulating device, oil or hydraulic fluid is pumped up from an oil reservoir 328 by means of the oil pump 309 and is supplied to an oil passage 331 having a pressure relief valve 417. The passage 331 communicates with an oil chamber 431 of the first pressure regulating valve 400. A spring 430 is provided at the back of a spool 433, and on the land of the spool 433 the oil pressure of the oil passage 331 acts. In response to movement of the spool 433, the annular area of a communicating passage between the oil chamber 431 and the oil chamber 432 is increased and decreased. The oil chamber 432 connects with an oil passage 332 for exhausting excess oil so as to regulate the pressure of the oil in the oil passage 331. Thereby, a regulated oil pressure level is supplied to each portion of the hydraulic control system through the oil passage 331.

The pressure of the excess oil exhausted to the oil passage 332 is regulated in an oil chamber 441 of the second pressure regulating valve 401 in accordance with movement of a spool 443 of the second pressure regulating valve 401. The spool 443 controls the area of an annular connecting passage between the oil chamber 441 and the oil chamber 442. The position of the spool 443 and the area of the annular opening depends on a balancing between the oil pressure existing in the oil passage 332 and the force of a spring 440 which is provided on the backside of the spool 443. Upon movement of the spool 443, a port connecting the oil passage 363 with a chamber of the second pressure regulating valve 401 is restricted by a land 445. This restricts the flow of oil returning from a torque converter 200 to the oil reservoir 328 by way of the valve 401. Thereby, the pressure of the excess oil discharged through the regulating valve 400 to the oil passage 333 is regulated. The excess oil in the passage 333 is supplied to the torque convertor 200 and to portions of the automatic transmission requiring lubrication.

A portion of the excess oil from the first pressure regulating valve 400, which is regulated in the second pressure regulating valve 401, is supplied to the oil passage 333 to the torque convertor 200, as described above, and returns to the oil chamber 442 of the second pressure regulating valve 401 from the torque convertor 200 by way of the return oil passage 363. From the oil chamber 442, the fluid returns to the oil reservoir 328 directly or through an intermediate oil cooler (not shown) by way of the oil passage 335. During this time, the spool 443 of the second pressure regulating valve 401 is designed to control an area of communication between the oil passage 363 and the oil chamber 442 by means of a land 445. Thereby, the amount of return oil from the torque convertor 200 through the return oil passage 363 and passing into the oil exhaust passage 335 is regulated from a constant quantity down to zero.

In the hydraulic pressure regulating device which comprises the first and second pressure regulating valves 400, 401, the oil pump 309, and the mechanism provided in the second pressure regulating valve 401 for regulating the quantity of return oil from the torque convertor 200, when a large quantity of oil is supplied through the oil passage 331 to each portion of the control circuit at the line pressure, the quantity of excess oil exhausted from the oil chamber 432 to the oil passage 332 through an annular gap A (FIG. 3) decreases and the pressures of the oil in the oil passage 332 is also decreased. Accordingly, the spool 443 of the second pressure regulating valve 401 moves upwardly by the force of the spring 440. This decreases the amount of oil which flows from the oil chamber 441 to the oil chamber 442 and flows through the oil exhaust passage 335 to the oil reservoir 328.

Further, by the upward movement of the spool 443, the connecting flow area between the return oil passage 363 and the oil chamber 442 is reduced by the land 445 of the spool 443 so as to reduce the quantity of oil supplied to the torque convertor 200. Thereby, oil pressure in the oil passage 333 is maintained and also the oil pressure and the quantity of oil for lubricating portions of the transmission requiring lubrication is maintained through the oil passage 334. Furthermore, when the amount of excess oil decreases, as it does at low vehicle speed, the land 445 of the spool 443 covers the communicating port between the oil passage 363 and the oil chamber 442 so as to significantly reduce the quantity of return oil from the torque convertor 500 under certain low speed conditions, for example, the return of oil from the torque convertor 200 is stopped completely by blockage of the passage by the land 445. Accordingly, return of oil from the torque convertor 200 may be greatly reduced or in fact terminated completely.

Such a reduction or stoppage of the return flow of oil is an important factor affecting the overheating of oil inside the torque convertor 200. Thus, a risk of damage to the torque convertor at these conditions is inherent in the design.

Figure 4:
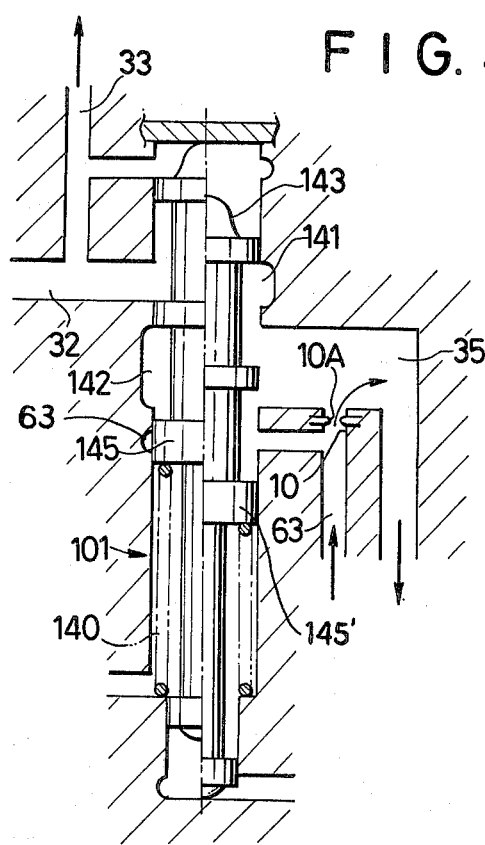
FIG. 4 is a flow circuit diagram to an enlarged scale showing the second pressure regulating valve of FIG. 2.
Figure 5:
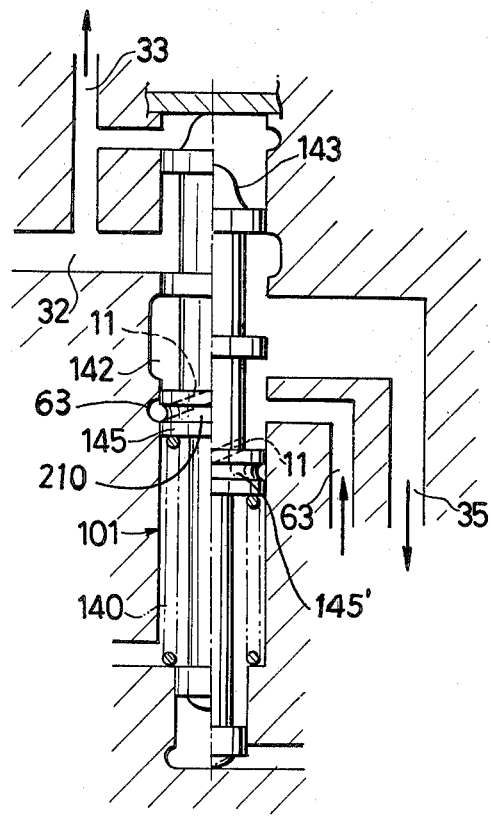
FIG. 5 is a flow circuit diagram to an enlarged scale of an alternative embodiment of a second pressure regulating valve in accordance with this invention.

FIGS. 2, 4 and 5 include a pressure regulating device in accordance with the invention. However, please note that the prior art pressure regulating device of FIG. 3 is also operative in the system of FIG. 2 in place of the corresponding pressure regulating device shown therein. All description of FIG. 3 is applicable to the construction of FIGS. 2, 4 and 5 except for those differences resulting from the novel constructions in accordance with the invention of FIGS. 4 and 5 as described hereinafter.

FIG. 4 is an enlarged sectional view of a pressure regulating device in accordance with the present invention (FIG. 2). The moving elements within the valve are illustrated with a division along the central axis such that upper and lower positions of the internal elements are shown in a single drawing. A hole 10 provides a small oil passage connecting between the return oil passage 63 from the torque convertor 200 and the oil exhaust passage 35. A restricted orifice 10A is positioned in the oil hole 10 and controls the quantity of flow passing through the hole 10. The left-side portion of the moving elements in FIG. 4 shown the land 145 in an upper position entirely blocking flow from the passage 63 to the passage 35 by way of the chamber 142. The right-side portion of the drawing shows the land, indicated as 145' in a lower position so that flow from the passage 63 readily passes into the chamber 142 and then to the passage 35.

With the small hole 10 and the restricted orifice 10A, thus provided, even when the communicating passage between the oil passage 63 and the oil chamber 142 is entirely covered by the land 145 in the second pressure regulating valve 101, the oil returning from the torque convertor 200 flows to the oil exhaust passage 35 through the hole 10 and orifice 10A as shown by arrows in FIG. 4. The oil in the passage 35 flows directly to the oil reservoir 28 through the cooler by-pass valve 118 or returns through an oil cooler (not shown) to the oil reservoir 28 after being cooled in the oil cooler. By means of the hole 10 and orifice 10A oil circulation is always maintained in the torque convertor 200 and a fresh supply of cooled oil is continuously supplied from the oil passage 33 providing the minimum quantity of flow to the torque convertor 200 which is necessary to prevent the oil from overheating in the convertor 200.

FIG. 5 shows an alternative embodiment of the second pressure regulating valve 101 in accordance with this invention. Corresponding parts in FIGS. 2 and 5 have the same reference numerals as they also do in FIG. 4. Again, the moving element is shown split along a central axis so that two positions of the moveable element are shown in FIG. 5. In this embodiment, the land 145 includes a peripheral oil channel 210 in its circumferential surface. A small bore hole 11 is provided in the spool 145 connecting between the oil channel 210 and the chamber 142 above the spool 145. As described above, when the spool 145 is in the upper position and shown on the left-side of FIG. 5, the connection between the passage 63 and the passage 35 is substantially blocked by the spool 145. However, in the embodiment of FIG. 5, oil flows from passage 63 into the oil groove 210 and from there through the bore hole 11 into the chamber 142 and then to the discharge passage 35. Thereby, a minimum flow of oil returning from the torque convertor 200 is always maintained regardless of the position of the spool 145 and the same effect as provided by the small opening 10 in FIG. 4 is obtained.

As previously stated, the oil pressure regulating device for an automatic transmission in accordance with this invention makes possible the prevention of overheating of oil in the torque convertor, because the oil passage is provided which maintains at least a minimum quantity of oil flowing out of the convertor 200.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A pressure regulating device for use in a hydraulic control system for an automatic transmission, said hydraulic control system having a fluid pump and a reservoir for fluid supplied to the inlet of said pump, comprising:

a first pressure regulating valve for regulating the discharge pressure of fluid from said pump, said pump supplying a controlled line pressure to an hydraulic control circuit;

a second pressure regulating valve for regulating the fluid pressure of an excess portion of said fluid supplied to said hydraulic control system, said excess fluid being supplied at regulated pressure to a torque convertor, said second pressure regulating valve including means in circuit between said torque convertor and said reservoir for regulating the quantity of fluid returning from said torque convertor to said reservoir in accordance with the pressure of said excess fluid, said quantity of fluid returning from said torque convertor increasing and decreasing in accordance with variations in said pressure of said excess fluid;

passage means for by-passing at least a portion of said fluid, returning from said torque convertor to said means for regulating quantity of fluid returning to said reservoir, from the regulating device and toward said reservoir, circulation to and from said reservoir of a minimum quantity of fluid for use in said torque convertor being maintained.

2. A pressure regulating device as claimed in claim 1, and further comprising:

first conduit means between said torque convertor and said means for regulating the quantity of fluid returning from said torque convertor, said returning fluid from said convertor flowing through said first conduit means;

said conduit means between said means for regulating the quantity of fluid returning from said torque convertor and said reservoir, and return fluid from said convertor flowing to said reservoir through said second conduit means; and said first and second conduit means sharing a common wall between them, said passage means for by-passing including a hole in said common wall, said hole connecting said first and second conduit means.

3. A pressure regulating device as claimed in claim 2 and further comprising a restricted orifice positioned in said hole, whereby said hole is made small and by-pass flow rate is controlled.

4. A pressure regulating device as claimed in claim 1, wherein said means for regulating quantity of flow returning from said torque convertor includes:

a moveable spool;

first conduit means carrying said return flow from said torque convertor;

second conduit means carrying said return flow from said means for regulating the quantity of fluid returning to said reservoir; and a variable flow opening between said first and said second conduit means, the size of said flow opening being varied by movement of said moveable spool.

5. A pressure regulating device as claimed in claim 4, wherein return flow through said variable opening is stopped at a position of said moveable spool, whereby said means for by-passing in the sole return flow path for fluid from said torque convertor.

6. A pressure regulating device as claimed in claim 4 or 5, wherein said passage means for by-passing includes a hole through said moveable spool, said hole providing connection between said first and second conduit means regardless of the position of said moveable spool.

* * * * *